United States Patent
Yen et al.

(10) Patent No.: US 7,451,356 B2
(45) Date of Patent: Nov. 11, 2008

(54) APPARATUS FOR CONFIGURING NETWORK MEDIA CONNECTIONS

(75) Inventors: Wen-Cheng Yen, Hsinchu (TW);
Chien-Sheng Chen, Taipei (TW);
Yung-Hung Chen, HouLong Township, Miaoli County (TW)

(73) Assignee: Faraday Technology Corp., Hsin-Chu (TW)

( * ) Notice: Subject to any disclaimer, the term of this patent is extended or adjusted under 35 U.S.C. 154(b) by 623 days.

(21) Appl. No.: 11/151,797

(22) Filed: Jun. 14, 2005

(65) Prior Publication Data

US 2007/0024340 A1    Feb. 1, 2007

(51) Int. Cl.
*G06F 11/00*    (2006.01)

(52) U.S. Cl. .......................... 714/43; 370/254

(58) Field of Classification Search ......... 370/241–258; 714/43
See application file for complete search history.

(56) References Cited

U.S. PATENT DOCUMENTS 6,833,734 B2 * 12/2004 Chan ........................... 326/82

* cited by examiner

*Primary Examiner*—Huy D Vu
*Assistant Examiner*—Alex Skripnikov
(74) *Attorney, Agent, or Firm*—Winston Hsu

(57) ABSTRACT

Apparatus for configuring network media connections. A medium-dependent interface crossover includes a first input terminal set comprising a first input pair and a first enabling pair, a second input terminal set comprising a second input pair and a second enabling pair, and an output pair selectively outputting data corresponding to data signals received by the first input pair or the second input pair. A detection circuit detects the data, and outputs a selection signal according to the detected data. A selection circuit receives the data signals, and provides the data signals to the first input pair or the second input pair and selects the first enabling pair or the second enabling pair according to the selection signal.

20 Claims, 5 Drawing Sheets

APPARATUS FOR CONFIGURING NETWORK MEDIA CONNECTIONS

BACKGROUND

The disclosure relates in general to medium-dependent interface crossover (MDIX) circuits. In particular, the disclosure relates to MDIX circuits with a switching current mode.

Medium-dependent interface (MDI)/MDIX is a type of Ethernet port connection using twisted pair cabling. The MDI is the component of the media attachment unit (MAU) that provides the physical and electrical connection to the cabling medium. An MDIX (for MDI crossover) is a version of MDI that enables connection between like devices. MDI ports connect to MDIX ports via straight-through twisted pair cabling, both MDI-to-MDI and MDIX-to-MDIX connections use crossover twisted pair cabling.

Many local area network (LAN) products use a medium consisting of twisted pair copper wire pairs for the transmission and reception of data. It is generally a requirement that one or more pairs be used for transmission of data in one direction and one or more other pairs to receive data in the opposite direction. The connection between two node devices is a link. Many LAN devices, which employ a full-duplex medium, have different pairs for transmission than for reception and require, therefore, that each end of the link use a defined assignment for its twisted pair connector to a particular pair of wires. If the transmitting pair of wires of one device is connected to the transmitting connectors of another, obviously the communication link will fail.

Most LAN standards address this problem by assigning different connector pins to the wires in the twisted pair at the RJ-45, often referred to as the medium-dependent interface (MDI). In switched networks, Network Interface Devices (NIC) may be directly connected to another NIC, or a repeater may be connected to another repeater, or a repeater may alternately be connected to a switch. Depending upon the assignment of pins in the network interface, it is sometimes necessary to use a crossover cable to address the problem of both products using the same pin designations on their interfaces. Determining whether the interface requires this cable can cause confusion and frustration if the customer lacks the necessary cable. To get around this problem, some products use a manual "MDIX" switch, which still, however, requires user intervention.

SUMMARY

Apparatus for configuring network media connections are provided. An embodiment of an apparatus for configuring network media connections comprises: a medium-dependent interface crossover comprising a first input terminal set comprising a first input pair and a first enabling pair, a second input terminal set comprising a second input pair and a second enabling pair, and an output pair selectively outputting data corresponding to data signals received by the first input pair or the second input pair; a detection circuit operative to detect the data, and output a selection signal according to the detected data; and a selection circuit operative to receive the data signals, and provide the data signals to the first input pair or the second input pair and select the first enabling pair or the second enabling pair according to the output selection signal.

An embodiment of another apparatus having a first input terminal set comprising a first input pair and a first enabling pair, a second input terminal set comprising a second input pair and a second enabling pair, and an output pair selectively outputting data corresponding to data signals received by the first input pair or the second input pair, for configuring network media connections, comprises: a pair of first input switches respectively coupled to the first input pair and a voltage source; a pair of first enabling switches respectively coupled between the corresponding first enabling pair, the first input switch and the output pair; a pair of second input switches respectively coupled to the second input pair, and the voltage source; a pair of second enabling switches respectively coupled between the corresponding second enabling pair, the second input switch, and the output pair; and a common mode feedback circuit coupled between the output pair, generating a direct current level of the data.

BRIEF DESCRIPTION OF THE DRAWINGS

The invention will become more fully understood from the detailed description, given hereinbelow, and the accompanying drawings. The drawings and description are provided for purposes of illustration only and, thus, are not intended to be limiting of the present invention.

DETAILED DESCRIPTION

Figure 1:
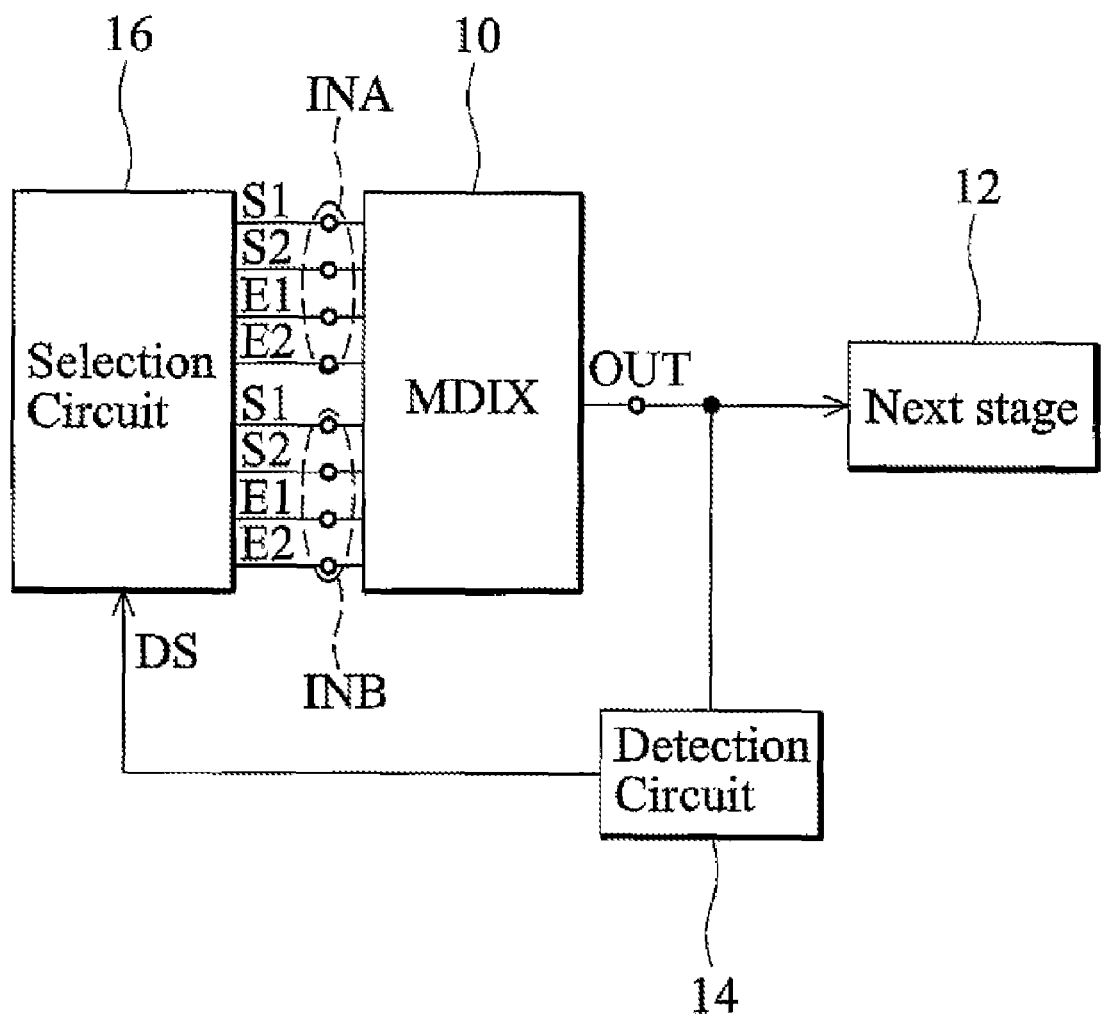
FIG. 1 is a circuit diagram of an apparatus for configuring network media connections according to an embodiment of the invention.
Figure 2A:
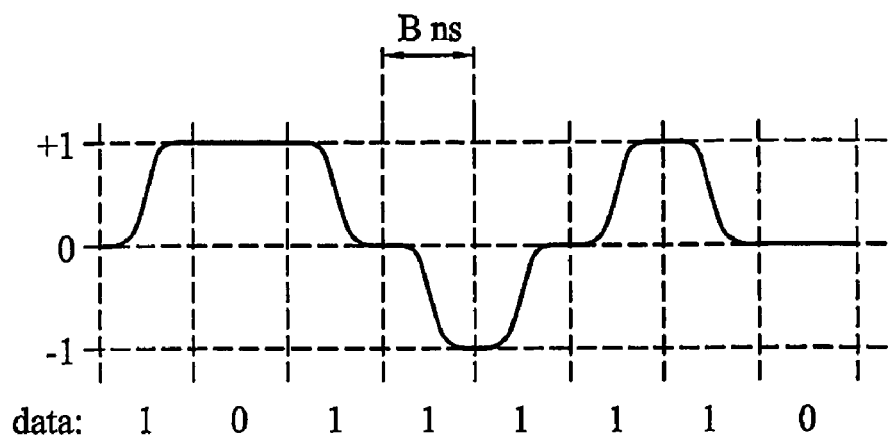
FIGS. 2A and 2B show an example of waveforms of input signals S1 and S2, respectively.
Figure 2B:
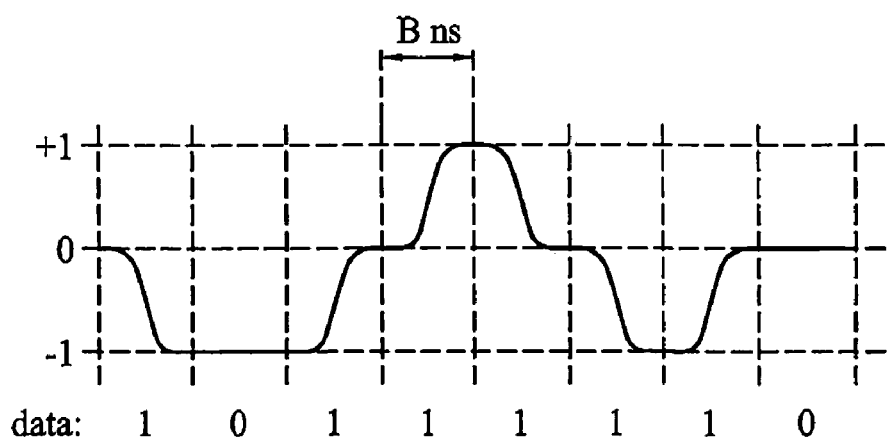

FIG. 1 is a circuit diagram of an apparatus for configuring network media connections according to an embodiment of the invention. Medium-dependent interface crossover (MDIX) 10 receives input signals S1 and S2 and enabling signals E1 and E2, transforms input signals S1 and S2, and outputs the transformed signals to next stage 12. FIGS. 2A and 2B show an example of waveforms of input signals S1 and S2, respectively. MDIX 10 comprises a first input terminal set INA comprising a first input pair receiving input signals S1 and S2, and a first enabling pair for receiving enabling signals E1 and E2, a second input terminal set INB comprising a second input pair receiving input signals S1 and S2 and a second enabling pair receiving enabling signals E1 and E2, and an output pair OUT outputting data corresponding to the signals received by the first input pair or the second input pair.

Detection circuit 14 detects the output data, and outputs selection signal DS according to the detected result. Detection circuit 14 detects whether the data corresponds to a predetermined format. If the data so, MDIX 10 connections are correct, and if not, incorrect. In an embodiment of the invention, the predetermined format of the data may have waveforms similar to those shown in FIGS. 2A and 2B, but with different direct current level or amplitude.

Selection circuit 16 receives data signals, comprising input signals S1 and S2 and enabling signals E1 and E2, provides the data signals to first input pair or the second input pair, and selects the first enabling pair or the second enabling pair according to the output selection signal. When detection circuit 14 detects output data corresponding to the predetermined format, selection circuit 16 provides the data signals to the same input pair of MDIX 10 and selects the same enabling pair, without changing connection state. When detection circuit 14 detects the output data does not corresponding to the predetermined format, selection circuit 16 provides data signals to different input pair of MDIX 10 and selects a different enabling pair, to correct connection state of MDIX 10.

Thus, the apparatus for configuring network media connections according to an embodiment of the invention automatically adjusts network connections of MDIX 10 by detecting output state of the MDIX 10.

Figure 3:
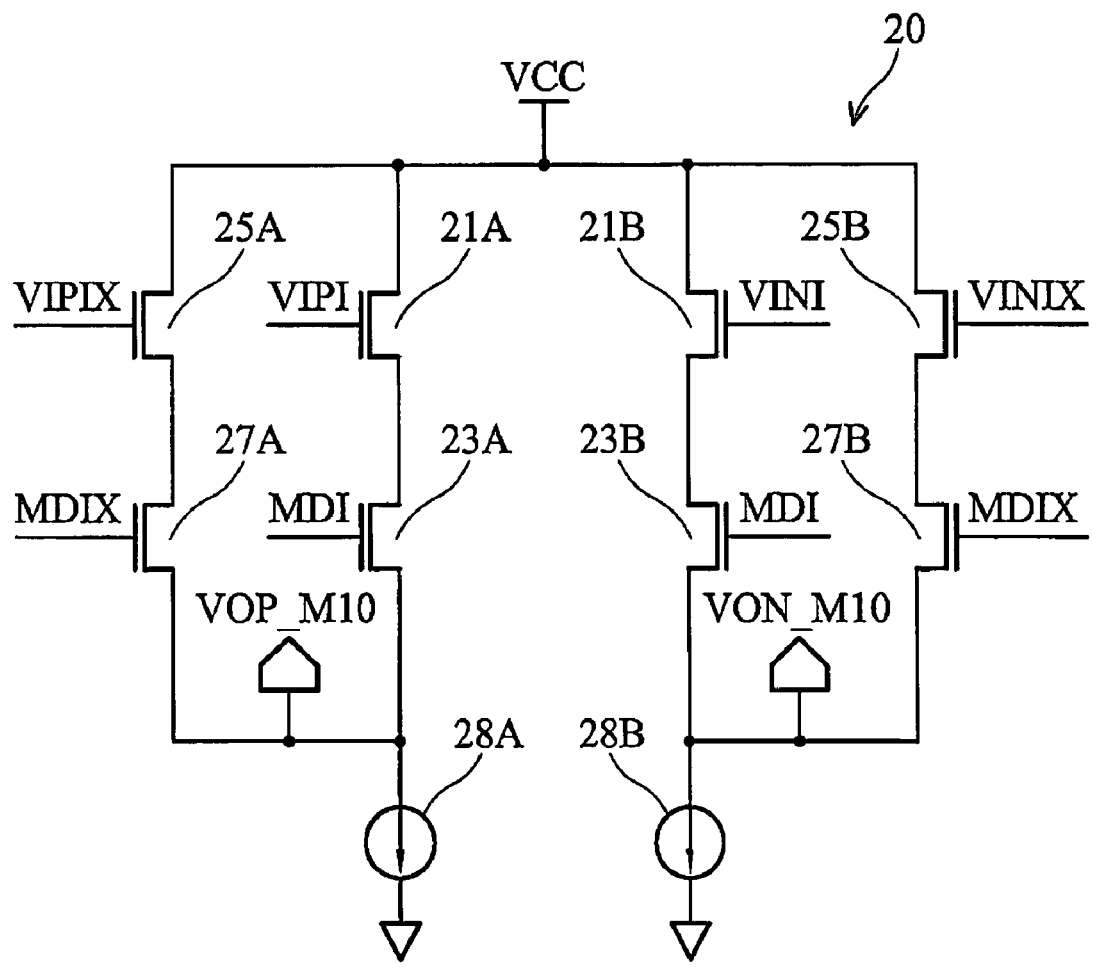
FIG. 3 is a circuit diagram of MDIX 20 of 10 M bits per second according to an embodiment of the invention.

FIG. 3 is a circuit diagram of MDIX 20 of 10 M bits per second according to an embodiment of the invention. Medium-dependent interface crossover (MDIX 20) comprises a pair of first input switches 21A and 21B respectively coupled to the first input pair VIPI and VINI, and a voltage source VCC. A pair of first enabling switches 23A and 23B are respectively coupled between the corresponding first enabling pair MDI, first input switch (21A or 21B) and output pair (VOP_M10 or VON_M10). A pair of second input switches 25A and 25B are respectively coupled to second input pair VIPIX and VINIX, and voltage source VCC. A pair of second enabling switches 27A and 27B is respectively coupled between the corresponding second enabling pair MDIX, the second input switch (25A or 25B), and the output pair (VOP_M10 or VON_M10). First current source 28A and second current source 28B are respectively coupled between the output pair (VOP_M10 or VON_M10) and ground.

Figure 4:
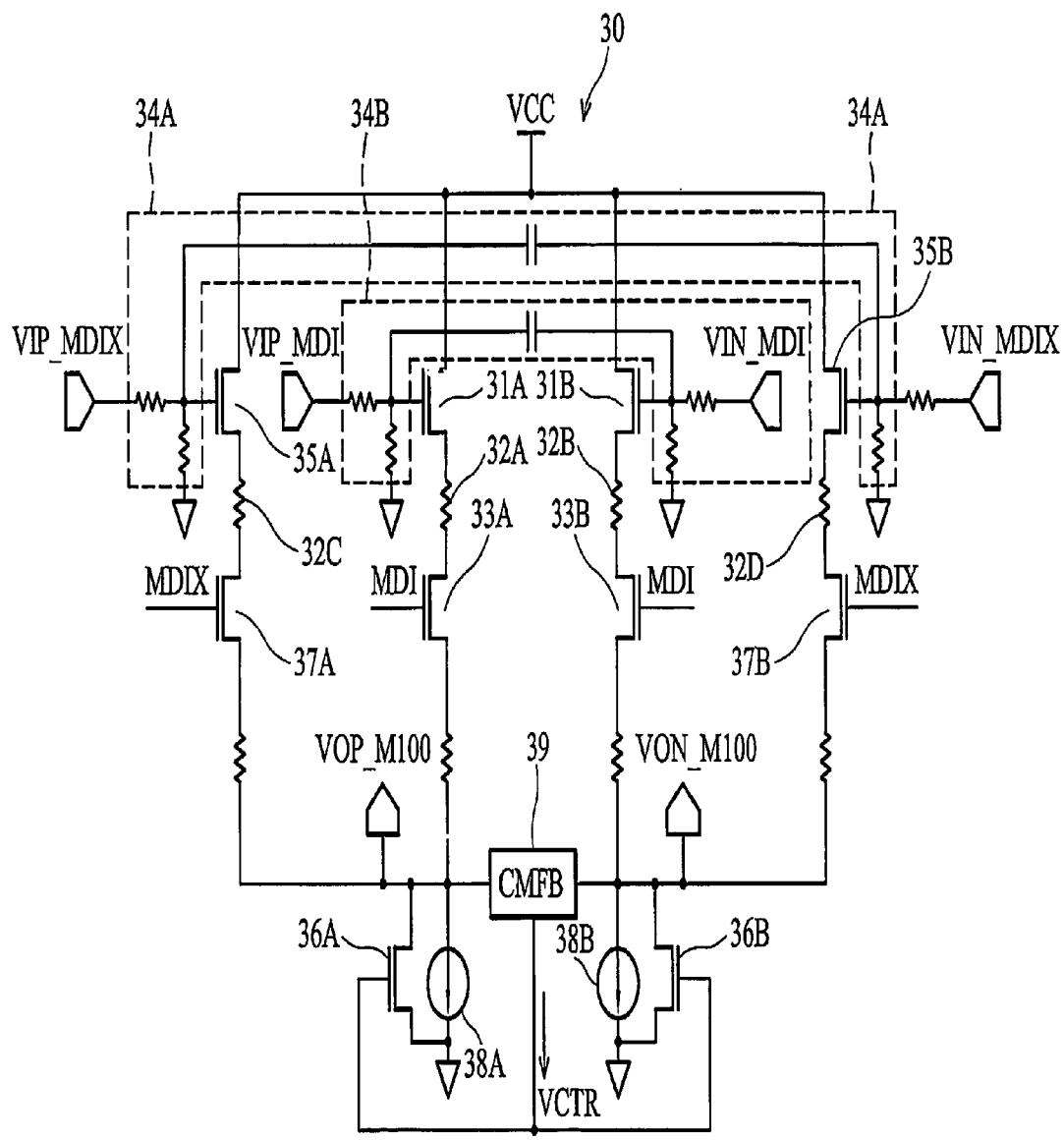
FIG. 4 is a circuit diagram of MDIX 30 of 100 M bits per second according to an embodiment of the invention.

FIG. 4 is a circuit diagram of MDIX 30 of 100 M bits per second according to an embodiment of the invention. Medium-dependent interface crossover (MDIX 30) comprises a pair of first input switches 31A and 31B respectively coupled to the first input pair VIP_MDI and VIN_MDI, and a voltage source VCC. A pair of first enabling switches 33A and 33B are respectively coupled between the corresponding first enabling pair MDI, first input switch (31A or 31B) and output pair (VOP_M100 or VON_M100). A pair of second input switches 35A and 35B are respectively coupled to second input pair VIP_MDIX and VIN_MDIX, and voltage source VCC. A pair of second enabling switches 37A and 37B are respectively coupled between the corresponding second enabling pair MDIX, the second input switch (35A or 35B), and the output pair (VOP_M100 or VON_M100). Resistor 32A is coupled between NMOS transistors 31A and 33A, resistor 32B is coupled between NMOS transistors 31B and 33B, resistor 32C is coupled between NMOS transistors 35A and 37A, and resistor 32D is coupled between NMOS transistors 35B and 37B. Thus, source follower circuits are formed at the input pairs to improve operation speed. First current source 38A and second current source 38B are respectively coupled to the output pair (VOP_M100 or VON_M100). NMOS transistor 36A comprises a drain and a source coupled to both terminals of first current source 38A. NMOS transistor 36B comprises a drain and a source coupled to both terminals of second current source 38B. Common mode feedback circuit (CMFB) 39 is coupled between output pair (VOP_M100 or VON_M100) for generating a direct current level of the data.

In addition, low pass filter 34A comprising resistors and a capacitor is connected between input pair VIP_MDIX and VIN_MDIX, filtering the high frequency signal received by input pair VIP_MDIX and VIN_MDIX, low pass filter 34B comprising resistors and a capacitor is connected between input pair VIP_MDI and VIN_MDI, filtering the high frequency signal received by input pair VIP_MDI and VIN_MDI.

Figure 5:
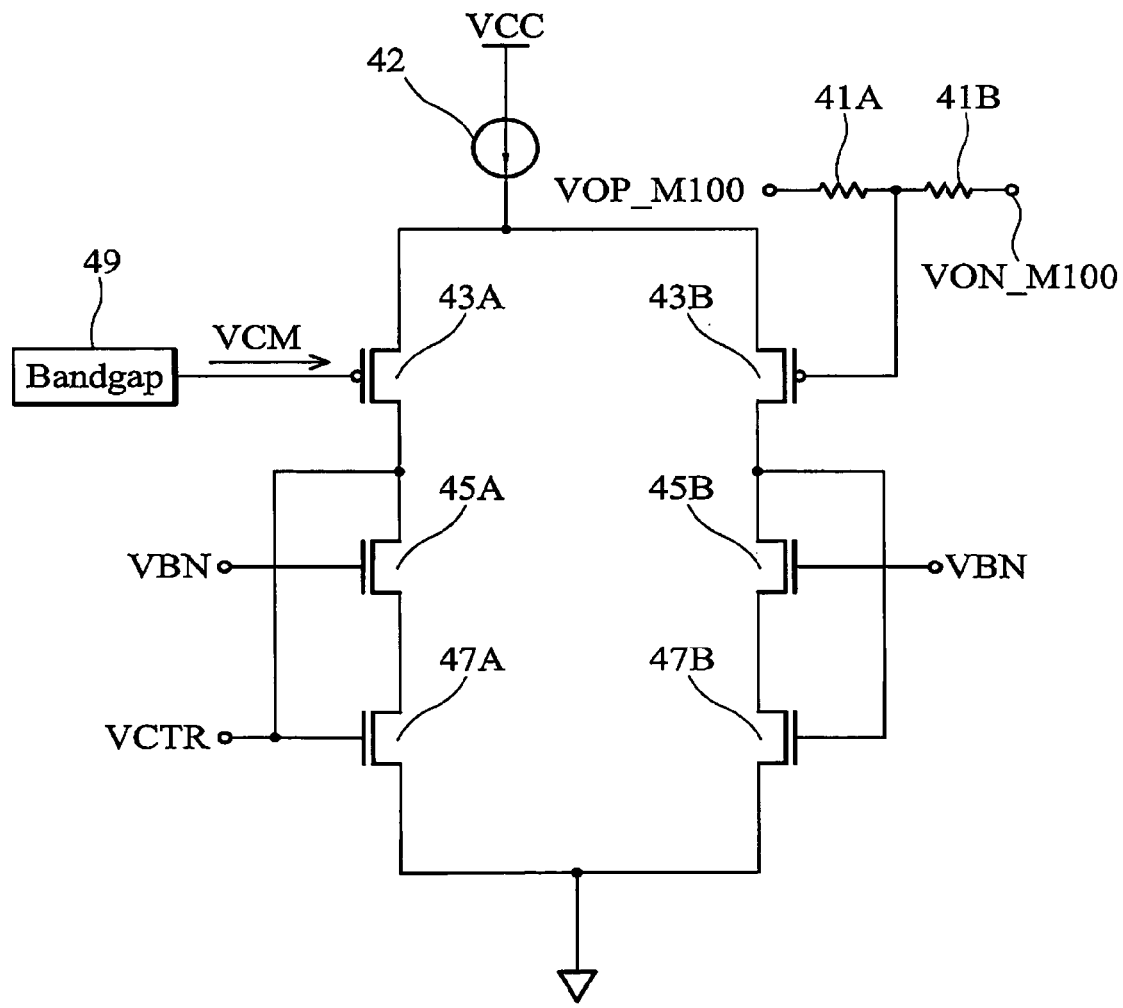
FIG. 5 is a circuit diagram of CMFB 39 according to an embodiment of the invention.

FIG. 5 is a circuit diagram of CMFB 39 according to an embodiment of the invention. Resistors 41A and 41B of the same resistance are coupled between the output pair VOP_M100 and VON_M100 in serial. Current source 42 is coupled voltage source VCC (3.3V as an example). PMOS transistor 43A comprises a gate coupled to reference voltage VCM provided by bandgap 49, a source coupled to the current source 42. The voltage level of reference voltage VCM can be 0.9V. NMOS transistor 47A comprises a gate coupled to the drain of PMOS transistor 43A, a drain coupled to the drain of PMOS transistor 43A, and a source coupled to ground. Note that the gate of NMOS transistor 47A is also coupled to the gates of NMOS transistor 36A and 36B. PMOS transistor 43B comprises a gate coupled to a connection point of resistors 41A and 41B, a source coupled to the current source 42. Note that the voltage level of the connection point of resistors 41A and 41B can reach that of reference voltage VCM (0.9V), the direct current level of the signal output by output pair VOP_M100 and VON_M100. NMOS transistor 47B comprises a gate coupled to the drain of PMOS transistor 43B, a drain coupled to the drain of PMOS transistor 43B, and a source coupled to ground. NMOS transistor 45A is coupled between PMOS transistor 43A and NMOS transistor 47A, and NMOS transistor 45B is coupled between PMOS transistor 43B and NMOS transistor 47B. Note that NMOS transistors 45A and 45B can be always turned on by signal VBN, or removed depending on the design of circuit. The turned on NMOS transistors 45A and 45B improve output impedance of NMOS transistors 47A and 47B.

The signal output by output pair VOP_M100 and VON_M100 is detected by detection circuit 14 shown in FIG. 1, wherein switches 33A and 33B are also selected by detection circuit 14. As selection circuit 16 provides input signals to input pair VIP_MDI and VIN_MDI, detection circuit 14 detects whether the data corresponds to a predetermined format. If the data corresponds to the predetermined format, the connections is correct. If not, selection circuit 16 provides input signals to input pair VIP_MDIX and VIN_MDIX and selects switches 37A and 37B. Thus, the network media connections are correctly configured.

The MDIX circuit according to the embodiments of the invention uses source follower circuit at the input pair, and CMFB circuit to increase level shift voltage and PVT variation. Thus, the apparatus for configuring network media connections according to the embodiments of the invention eliminates the care of crossover cable, simplifying network installation.

The foregoing description of several embodiments have been presented for the purpose of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. An apparatus for configuring network media connections, comprising:

a medium-dependent interface crossover comprising a first input terminal set comprising a first input pair and a first enabling pair, a second input terminal set comprising a second input pair and a second enabling pair, and an output pair selectively outputting data corresponding to data signals received by the first input pair or the second input pair;

a detection circuit operative to detect the data output by the output pair, and output a selection signal according to the detected data; and a selection circuit operative to receive the data signals and enabling siginals, and provide the data signals to the first input pair or the second input pair and select the first enabling pair or the second enabling pair according to the selection signal and the enabling siginals.

2. The apparatus as claimed in claim 1, further comprising a first current source and a second current source respectively coupled to the output pair.

3. The apparatus as claimed in claim 2, further comprising:

a first NMOS transistor comprising a first drain and a first source coupled to both terminals of the first current source, and a first gate; and a second NMOS transistor comprising a second drain and a second source coupled to both terminals of the second current source, and a second gate.

4. The apparatus as claimed in claim 3, wherein the medium-dependent interface crossover further comprises a common mode feedback circuit coupled between the output pair for generating a direct current level of the data.

5. The apparatus as claimed in claim 4, wherein the common mode feedback circuit comprises two resistors, of the same resistance coupled between the output pair in serial.

6. The apparatus as claimed in claim 5, wherein the common mode feedback circuit further comprises:
   a third current source;
   a first PMOS transistor comprising a third gate coupled to a reference voltage, a third source coupled to the third current source, and a third drain;
   a third NMOS transistor comprising a fourth gate coupled to the third drain, a fourth drain coupled to the third drain, and a fourth source coupled to ground;
   a second PMOS transistor comprising a fifth gate coupled to a connection point of the resistors, a fifth source coupled to the third current source, and a fifth drain; and
   a fourth NMOS transistor comprising a sixth gate coupled to the fifth drain, a sixth drain coupled to the fifth drain, and a sixth source coupled to ground.

7. The apparatus as claimed in claim 6, wherein the common mode feedback circuit further comprises:
   a fifth NMOS transistor comprising a seventh drain coupled to the third drain, and a seventh source coupled to the fourth drain; and
   a sixth NMOS transistor comprising an eighth drain coupled to the fifth drain, and an eighth source coupled to the sixth drain.

8. The apparatus as claimed in claim 7, wherein the fifth NMOS transistor and the sixth NMOS transistor improve output impedance of the third NMOS transistor and the fourth NMOS transistor.

9. The apparatus as claimed in claim 6, wherein the third drain and the fifth drain are respectively coupled to the first gate and the second gate.

10. The apparatus as claimed in claim 1, wherein the medium-dependent interface crossover further comprises:
    a pair of first input switches respectively coupled to the first input pair and a voltage source;
    a pair of first enabling switches respectively coupled between the corresponding first enabling pair, the first input switch and the output pair;
    a pair of second input switches respectively coupled to the second input pair, and the voltage source; and
    a pair of second enabling switches respectively coupled between the corresponding second enabling pair, the second input switch, and the output pair.

11. The apparatus as claimed in claim 10, wherein the first input switch, the second input switch, the first enabling switch, and the second enabling switch are NMOS transistors.

12. The apparatus as claimed in claim 1, wherein the medium-dependent interface crossover further comprises:
    a first filter circuit coupled between the first input pair; and
    a second filter circuit coupled between the second input pair.

13. The apparatus as claimed in claim 1, wherein the detection circuit detects whether the data corresponds to a predetermined format.

14. The apparatus as claimed in claim 4, wherein the direct current level is the reference voltage.

15. An apparatus having a first input terminal set comprising a first input pair and a first enabling pair, a second input terminal set comprising a second input pair and a second enabling pair, and an output pair selectively outputting data corresponding to data signals received by the first input pair or the second input pair, for configuring network media connections, comprising:
    a pair of first input switches respectively coupled to the first input pair and a voltage source;
    a pair of first enabling switches respectively coupled between the corresponding first enabling pair, the first input switch and the output pair;
    a pair of second input switches respectively coupled to the second input pair, and the voltage source;
    a pair of second enabling switches respectively coupled between the corresponding second enabling pair, the second input switch, and the output pair; and
    a common mode feedback circuit coupled between the output pair for generating a direct current level of the data.

16. The apparatus as claimed in claim 15, further comprising a first current source and a second current source respectively coupled to the output pair.

17. The apparatus as claimed in claim 16, further comprising:
    a first NMOS transistor comprising a first drain and a first source coupled to both terminals of the first current source, and a first gate; and
    a second NMOS transistor comprising a second drain and a second source coupled to both terminals of the second current source, and a second gate.

18. The apparatus as claimed in claim 15, wherein the common mode feedback circuit comprises:
    two resistors, of the same resistance coupled between the output pair in serial;
    a third current source;
    a first PMOS transistor comprising a third gate coupled to a reference voltage, a third source coupled to the third current source, and a third drain;
    a third NMOS transistor comprising a fourth gate coupled to the third drain, a fourth drain coupled to the third drain, and a fourth source coupled to ground;
    a second PMOS transistor comprising a fifth gate coupled to a connection point of the resistors, a fifth source coupled to the third current source, and a fifth drain; and
    a fourth NMOS transistor comprising a sixth gate coupled to the fifth drain, a sixth drain coupled to the fifth drain, and a sixth source coupled to ground.

19. The apparatus as claimed in claim 18, wherein the third drain and the fifth drain are respectively coupled to the first gate and the second gate.

20. The apparatus as claimed in claim 15, further comprising:
    a first filter circuit coupled between the first input pair; and
    a second filter circuit coupled between the second input pair.

* * * * *